(12) United States Patent
Ishida et al.

(10) Patent No.: US 6,336,639 B1
(45) Date of Patent: Jan. 8, 2002

(54) METAL GASKETS

(75) Inventors: Kenji Ishida; Yutaka Furuta; Tomoyoshi Ogaeri; Tsuyoshi Hiramatsu; Naoki Ii, all of Osaka (JP)

(73) Assignee: Nippon Gasket Co., Ltd., Osaka-fu (JP)

( * ) Notice: Subject to any disclaimer, the term of this patent is extended or adjusted under 35 U.S.C. 154(b) by 0 days.

(21) Appl. No.: 09/365,871

(22) Filed: Aug. 3, 1999

(30) Foreign Application Priority Data

Aug. 27, 1998 (JP) .......................................... 10-241511

(51) Int. Cl.⁷ ................................................ F02F 11/00
(52) U.S. Cl. ........................................ 277/594; 595/598
(58) Field of Search ................................. 277/591, 592, 277/593, 594, 595, 598

(56) References Cited

U.S. PATENT DOCUMENTS

| | | | |
|---|---|---|---|
| 4,834,399 A | * | 5/1989 | Udagawa et al. |
| 5,209,504 A | * | 5/1993 | Udagawa |
| 5,213,345 A | * | 5/1993 | Udagawa |
| 5,294,135 A | * | 3/1994 | Kubouchi et al. |
| 5,310,196 A | * | 5/1994 | Kawaguchi et al. |
| 5,490,681 A | * | 2/1996 | Plunkett et al. |
| 5,522,604 A | * | 6/1996 | Weiss et al. |
| 5,669,612 A | * | 9/1997 | Nicholson |
| 5,836,562 A | * | 11/1998 | Danzyger et al. |
| 5,927,724 A | * | 7/1999 | Maschmann et al. |
| 5,988,650 A | * | 11/1999 | Plunkett |
| 6,019,376 A | * | 2/2000 | Miyaoh |
| 6,089,572 A | * | 7/2000 | Plunkett |

FOREIGN PATENT DOCUMENTS

| JP | 61255253 | | 11/1986 |
|---|---|---|---|
| JP | 63101575 | | 5/1988 |
| JP | 1118147 | | 8/1989 |
| JP | 1118148 | | 8/1989 |
| JP | 1134761 | | 9/1989 |
| JP | 415372 | | 1/1992 |
| JP | 404248071 A | * | 9/1992 |
| JP | 60170053 | | 11/1995 |

* cited by examiner

*Primary Examiner*—Anthony Knight
*Assistant Examiner*—Vishal Patel
(74) *Attorney, Agent, or Firm*—Browdy and Neimark

(57) ABSTRACT

A metal gasket is disclosed which is used arranged between a cylinder block and a cylinder head. The metal gasket comprises carrier plates having thereon beads, and a stopper plate overlaid on the carrier plates and provided with folded constructions, which are each composed of a folded flange area and its counterpart area confronting each other so as to provide a gap of a preselected interval between them. The gaps exert elasticity on the folded flange areas continuously whenever the gasket is squeezed and loaded due to engine operation whereby the folded constructions may compensate for intolerable clearance that might occur owing to the distortion in fatigue of the cylinder block with respect to the gasket, with resulting in improving sealing performance of the gasket.

13 Claims, 13 Drawing Sheets

$a_1 < a_2 < a_3, \quad d_1 < d_2 < d_3$ $ax_1 = ax_2 = ax_3$ $dx_1 < dx_2 < dx_3$ $a_{Y1} < a_{Y2} < a_{Y3}$ $d_{Y1} = d_{Y2} = d_{Y3}$

METAL GASKETS

BACKGROUND OF THE INVENTION

1. Field of the Invention

The present invention relates to a metal gasket for sealing between confronting surfaces of the cylinder block and the cylinder head in the engine and, more particularly, to the metal gasket composed of carrier plate with beads thereon and a stopper plate with folded constructions thereon.

2. Description of the Prior Art

Conventionally, the metal gaskets have been widely applied to the engines in sealing between a cast-iron cylinder block, which is less in both of wall thickness and weight, and an aluminum cylinder head of less weight and also in sealing between the aluminum-made block and head. In prior metal gaskets of various types, a metal gasket has been well known to those skilled in the art, which includes a stopper plate having folded constructions to help ensure what is referred as "compression stopper function", which protects a bead carrier plate from a permanent set or flattering out owing to the excessive compressive loading or stress. The exemplary metal gaskets having the compression stopper function are disclosed in Japanese Utility Model Laid-Open Nos. 170053/1985; 118147/1989; 118148/1989; 134761/1989 and Japanese Patent Laid-Open Nos. 255253/1986; 101575/1988 and 15372/1992. Although the folded constructions in the prior metal gaskets disclosed in the above citations have for their objects to achieve the functions or effects of compression stopper as well as air-tight sealing, there has been heretofore disclosed no concept or consideration as to what change happens at a gap in the folded construction during engine operation, or how relationship is present between the degree or effect of the gap and the structure or material of the engines.

Experimental data required for the design of metal gasket have been commonly obtained by measuring the deformation in the cylinder head when the cylinder bores have been repeatedly compressed and decompressed, on the assumption that the cylinder block may be considered an absolute or ideal rigid body and, therefore, only the cylinder head is subject to the deformation due to the engine operation. As an alternative prior art to gain the data for the metal gasket design, the thermal deformation of the cylinder head has been measured, which takes place when the cylinder head is heated up to a high temperature.

Nevertheless, the prior experimental data heretofore prevailed for the design of metal gasket, whether it depends on variation in pressure or in temperature, belongs to the data as to the static deformation and, therefore, fails in measuring the simulation of the phenomenon, which may come into action in the metal gasket, accompanied with the deformation which might occur in the cylinder block when the metal gasket is squeezed interposed between the mating cylinder block and head, the permanent distortion which might exerted on the cylinder block owing to undue thermal stress or fatigue as a result of the engine operation, and the intolerable clearance caused between the gasket and the cylinder block by the distortion in the cylinder block or head. That is to say, any prior experience for the design of the metal gasket has provided no data representing the true behavior on the deformation of the metal gasket, which fairly reflects the operating conditions of the engine. Moreover, the state of the art in metal gaskets has recently progressed in the theoretical analysis technique on an aspect of dynamics of structure in accordance with the finite-element method, whereas there is scarcely any experimental data about the behavior of the metal gasket, which is in compliance with the behavior of the distortion occurring in the cylinder head under the test of actual engine performance. Thus, such prior state of the art in metal gaskets has been quite insufficient to design and produce the metal gaskets rich in reliability.

Referring to FIG. 19 in which a conventional metal gasket is shown placed between confronting surfaces of a cylinder head 20 and a cylinder block 21, which are made of either aluminum alloy or thin cast iron, the metal gasket is composed of a pair of carrier plates 22, 24 having thereon with corrugations, or beads, not shown, and a stopper plate 23 partially folded back so as to have flanges 25 that are made in face-to-face close engagement with any one surface of the major portion of the stopper plate 23. When squeezing or tightening the metal gasket constructed as described above between the mating surfaces of the cylinder head 20 and the cylinder block 21, the cylinder block 21 is often rendered deformed at 36, or at peripheral edges around cylinder bores in the cylinder block 21, which may results from either the thermal stress or the fatigue owing to the engine operation. This causes the permanent set or permanent strain in the associated carrier plate 24 of the metal gasket, resulting in causing intolerable clearances 36S between the associated plates of the metal gasket. Thus, the metal gasket is made inferior in sealing performance and, in some cases, damaged by cracks or the like, which may be caused at beads formed on the carrier plates 22, 24. It will be noted that the cause of the problem involved in the prior metal gasket is somewhat exaggerated in schematic view of FIG. 19.

The major sources of the damages occurring in the prior metal gaskets may be considered as follows. In the stopper plate incorporated in the prior metal gasket, in which the folded flanges are made in face-to-face close contact with the major portion of the stopper plate around the entire periphery of the cylinder bores, the folded constructions are designed so as to become relatively higher in strength, so that they remain in substantially horizontal state they have been placed on the deck surface of the cylinder block, even under the thermal stress during the engine operation. Thus, the folded constructions may not help compensate for undue clearances that might happen between the bottom surface of the metal gasket and the mating deck surface around the peripheral edges of the cylinder bores. It would seem most fitting that such undue clearances grow into permanent set or permanent distortion in the bead carrier plates, resulting in the occurrence of intolerable clearances either between any adjoining metal plates or between the cylinder block and its associated bead carrier plate. Moreover, in case where the intolerable clearances occurring in the metal gasket result in increasing excessively the intervals of gaps in the folded constructions of the stopper plate and also the strength of the folded constructions is too inadequate for compensating for the intolerable clearances, a serious problem arises in which the engine operation as in starting the engine causes repeatedly a vicious spiral of premature loss of the gaps, permanent set in fatigue of the beads, reduction in compressive force of the tightening bolts, increase in distortion of the cylinder head and propagation of the permanent set, thus resulting in making it much more difficult to compensate for the changes of the clearances between the cylinder block and the head. This causes cracks at the beads of the carrier plates, which are thus subject to the corrosion at the beads by the gases leaking out of the cracked beads with the result of the failure in sealing performance of the metal gaskets. The problem described just above will become increasingly critical under any situation where the compressive forces of the tightening bolts are considered less or the counter-bores are less in depth.

In a metal gasket a stopper plate is partially folded back to thereby form the folded constructions for providing the compression stopper function, the folded constructions are simply twice as thick as the stopper plate. The folded constructions of twice thicker than the stopper plate itself, in some cases, are too sufficient for the compressive stopper function, instead, may cause sometimes the stress concentration of the compressive surface-to-surface pressure at the areas around the cylinder bores. Such concentration of the compressive surface-to-surface pressure occurring in the folded constructions makes worse the uniformity of the compressive surface-to-surface pressure over the entire mating surfaces of the metal gasket, namely, makes unbalance of the compressive stress between at the areas around the cylinder bores and at the other residual area, for example, around openings for cooling water or oil. A consequent problem may arise in the sealing performance around the openings for water or oil. Moreover, the stopper plate of the type described above has the disadvantages of causing the cracks owing to undue the stress concentration at the folded constructions, especially, at the bents of the folded flanges for defining the cylinder bores, and also of not providing sufficient elastic deformation to the beads of the carrier plates thereby failing in forming the reliable annular face-to-face contact areas.

Most stopper plates are by nature to protect the beads on the carrier plates from the permanent set or flattening out when the metal gasket is squeezed by the action of the tightening force. In the stopper plate in which positive stoppers are provided by partially folding back a metal plate, each folded construction should have an amount of gap of at most about 10 $\mu$m in order to helpensure the amount of compression stop kept uniform around the associated cylinder bore. In contrast, even if the amount of gap at the folded construction exceeds about 10 $\mu$m, there is a danger that the folded construction is lost on the compression stopper function. As will be understood from the foregoing description, it will be thus anticipated to develop a metal gasket protected from the failure of sealing performance owing to the inadequate gaps at the folded constructions and the consequent permanent set in fatigue of the beads. Moreover, the metal gasket ought to cope with the intolerable clearances that might occur between the mating surfaces of the metal gasket and the cylinder block around the periphery of the cylinder bores. More particular, it is expected to resist against the decline in sealing performance and the unanticipated cracks, which might otherwise occur at the beads due to the increase of the intolerable clearances caused by the folded constructions lacking of compensation for the intolerable clearances, and also protect the beads against the corrosion resulting from the combustion gases leaking out of the intolerable clearances.

SUMMARY OF THE INVENTION

The present invention has for its primary object to provide an improvement in a metal gasket suitable for engines of structures or materials compelled to admit less squeezing force of head bolts, for example, an engine having more than six cylinders, in which it is very hard to keep a compressive stress due to squeezing force uniform throughout the entire surfaces of the metal gasket. More particularly, the primary object of the present invention is to provide an improved metal gasket ensuring the sealing function for the mating surfaces of the cylinder block and the head, and further ensuring the compressive beads against damage, thereby resulting in helping ensure the long service life. To this end, the improved metal gasket of the present invention is comprised of carrier plates with compressive beads thereon, and a stopper plate arranged in an overlapping relation with the carrier plates and provided integrally with folded constructions, where folded flanges are kept spaced due to the elasticity away from the confronting surface of the stopper plate even during the engine operation whereby the folded constructions elastically compensate for intolerable clearances occurring between the metal gasket and cylinder block.

The present invention is concerned with a metal gasket comprising at least one carrier plate of an elastic metal plate adapted to be used interposed between a cylinder block and a cylinder head to be fixed to the cylinder block, the carrier plate being provided with first bore openings and beads that are each developed along the associated first bore opening, and a stopper plate of an elastic metal plate overlaid on the carrier plate, the stopper plate being partially folded back thereby providing annular folded constructions to define second bore openings in alignment with the first bore openings, wherein the beads on the carrier plate are overlaid on the stopper plate at areas spaced apart from the folded constructions which are each composed of a folded flange area and its counterpart area extending along a perimeter of the associated second bore opening, and the folded constructions each include a gap of a preselected interval between the folded flange area and its counterpart area to provide elasticity at the folded construction continuously whenever the gasket is loaded inclusive of under engine operation.

The stopper plate is to protect the compressive beads on the carrier plates against permanent set or flattening out when squeezed by the head bolts, and also to compensate elastically for the intolerable clearances that might occur in the cylinder block. Moreover, with the stopper plate being overlaid to the carrier plates, the folded constructions of the stopper plate are kept apart away from the beads on the carrier plates continuously with no relation to whether the gasket is in any one of released event, squeezed event and engine operation.

According to one aspect of the present invention, a metal gasket is provided wherein the stopper plate is overlaid on the carrier plate such that raised surfaces of the beads on the carrier plate make abutment against a major flat surface of the stopper plate while the beads are spaced apart from perimetric edges of the folded flange areas of the folded constructions in the stopper plate. Moreover, the stopper plate may be arranged interposed between the confronting carrier plates with beads in such a manner that the raised surfaces of the beads on the carrier plates make abutment against the major flat surface of the stopper plate. As an alternative, the stopper plate may be overlaid on the carrier plate such that recessed surfaces of the beads confront a major flat surface of the stopper plate while perimetric edges around the first bore openings in the carrier plate are spaced apart from the perimetric edges of the folded flange areas of the folded constructions on the stopper plate.

In another aspect of the present invention a metal gasket is provided wherein the stopper plate is used in such arrangement that the folded flange areas in the folded constructions make contact with the cylinder block whereby the elasticity exerted by the folded flange areas compensates for intolerable clearance, or distortion, occurring in the cylinder block. The gaps between the folded flange areas and the counterpart areas are adequately kept even under such event that the gasket is subjected to the squeezing or tightening load. The gaps provided between the confronting folded flange areas and the counterpart areas are preset to hold the range of from 20 μm to 200 μm in the released event. In addition, an amount of compression stop anticipated by the folded constructions is preselected in a range of from 100 μm to 360 μm in a released event. Furthermore, a compressive surface-to-surface pressure at the folded constructions on the stopper plate is preselected in a range of from 70 MPa to 140 MPa while a compressive surface-to-surface pressure at the beads on the carrier plate is preselected in a range of from 10 MPa to 110 MPa.

In another aspect of the present invention a metal gasket is provided wherein the folded constructions of the stopper plate are each regulated in its width along circumferences of the associated second bore opening in such a manner that it is made less at zones including a plane spanning across centers of any adjoining second bore openings, while made greater at other residual zones. Moreover, while the gaps provided between the folded flange areas and their counterpart areas are regulated in intervals so as to differ for each of the juxtaposed second bore openings, the folded constructions are also regulated in widths so as to differ for each of the juxtaposed second bore openings.

In a further another aspect of the present invention a metal gasket is provided wherein the folded constructions are formed by partly folding back thin areas of the stopper plate into folded flange areas, which are reduced in thickness, compared with a major portion of the stopper plate, to an extent more than half the major portion. Moreover, an amount of compression stop to control the degree of compression exerted on the beads comes into action due to the difference in thickness between the folded construction and the major portion of the stopper plate and, therefore, the amount of compression stop is regulated in accordance with the thickness of the thin areas that is reduced, compared with the major portion. The compression stopper function arising in the stopper plate of the present invention may be relieved compared with that of the stopper plate in which the stopper constructions are formed by only doubling over a simple stopper plate uniform in thickness. According to the present invention, since the thin areas of the stopper plate are reduced down to a thickness more than half the residual major potion of the stopper plate, doubling the thin area into two, namely, the folded flange area and the counterpart area, results in providing a folded construction, or stopper construction, which is made greater in total thickness than the major portion, but less than twice the major portion.

The stopper plate of the present invention causes no excessive concentration of the compressive surface-to-surface pressure at the folded constructions when the metal gasket is squeezed between the mating surfaces of the cylinder block and head. At the same time, the beads on the carrier plates are subjected to an adequate compressive deformation, thereby providing annular elastic contacting areas sufficient to help ensure satisfactory sealing performance.

In another aspect of the present invention, a folded construction is provided wherein confronting surfaces of the folded flange area and the counter area are partially or substantially throughout coated with elastic material. Coating the elastic material on the surfaces defining the gap in the folded construction provides the cushioning performance to help keep the spring action even in the event the gap is made reduced under compressive loading. Consequently, a minimum spring action or stopper function may be ensured with no permanent set or deformation in fatigue even in the areas other than the compression side of the sharp bent at the folded construction. According to another aspect of the present invention, a composite material containing aluminum and chlorine is applied to the compression side at the sharp bent in the folded construction, where a penetration layer of aluminum is built up on the applied surface of the compression side by thermal diffusion of aluminum during the engine operation. The diffusion-penetration layer built in the compression side at the sharp bent contributes to the protection of the sharp bent in the folded construction against the deterioration in strength, thereby reducing or substantially eliminating the permanent set of deformation in fatigue at the sharp bent. The amount of compression stop to control the degree of compression exerted on the beads comes into action due to the difference in thickness between the folded construction and the major portion of the stopper plate and, therefore, the amount of compression stop is regulated, depending on the thickness of the thin areas, which is reduced compared with the major portion of the stopper plate.

In accordance with the metal gasket constructed as described just above, the folded constructions of the stopper plate may not only develop an adequate compressive surface-to-surface pressure, but also regulate the amount of compression stop for the beads on the carrier plates. The folded constructions assure the gaps thereof the elasticity to keep the gaps at an adequate situation regardless of compressive stress due to not only squeezing force of head bolts but also engine operation. The elasticity at the folded construction forces the gaps into expanding to compensate for the intolerable clearances that might take place owing to the permanent distortion occurring in the cylinder block or head around the cylinder bores. That is to say, the gaps in the folded constructions may undergo change in intervals, following the increase of the clearances between any mating surfaces, to make up for the intolerable clearances, thereby keeping the compressive surface-to-surface pressure at an adequate pressure level for a long service life. This makes it possible to eliminate the occurrence of unanticipated clearances between any adjoining overlaid metal plates, thus protecting the metal plates against the leakage of gases into between the metal plates with result of maintaining the sealing performance.

In the metal gasket of the present invention, the gaps in the folded construction are designed to continue to keep the acting action, stopper effect and sealing performance at their minimum requisitions. The gaps provided in the folded constructions are regulated properly in the released event before squeezing by head bolts and also hold the confronting surfaces of the folded constructions, spanning across the gaps, at an elastic relation such that the confronting surfaces make scarcely engagement throughout with each other even under the engine operation. The elasticity to keep the gaps regardless of compressive load is in particular provided at the compression side of the sharp bent in the folded construction. Furthermore, the stopper plate is used in such arrangement that the folded flange areas in the folded constructions make contact with the cylinder block whereby the elasticity exerted by the folded flange areas compensates for the intolerable clearances that might happen, in particular, due to the distortion occurring in the cylinder block.

Although the gaps in the folded constructions becomes narrower gradually with the lapse of time during which the engine operates, the gaps are set such that they are kept from being completely crushed or collapsed. The regulation of the gaps in the folded constructions at the released event prior to squeezing by the head bolts must be carried out with having considered that the gaps in the folded constructions are compressed much at the initial squeezing and thus made less in intervals at areas neighboring the head bolts, compared with the intervals at the other areas. Thus, the metal gasket may be not only protected against the leakage of combustion gases and enhanced in the stopper effect, but also prevented from the permanent set or deformation in fatigue of the gaps in the folded constructions.

When the distortion around the cylinder bores in the cylinder block becomes too large, the distortion results in increasing the intolerable clearances between the bottom surfaces of the metal gasket and the upper surface of the cylinder block at the areas neighboring the perimetric edges of the cylinder bores, or between mating surfaces of the folded constructions and the cylinder block. Nonetheless, the gaps in the folded constructions, in particular, at the compression sides of the sharp bents, are kept at a constant interval. In the released event prior to the squeezing of head bolts, the gaps at the compression sides in the folded constructions are not formed in a circle, but in a shape of U or raindrop turned sidewise, so that they may be kept at a somewhat compressed raindrop-shape to resist against the collapse or crush. Thus, the gaps at the compression sides make downward deformation, following the increase of the intolerable clearances caused by the distortion in the cylinder block, thereby compensating for the intolerable clearances to help ensure both the stopper effect and the sealing performance.

Compensating for the intolerable clearances with the folded constructions results in keeping the metal gasket from the invasion of the combustion gases and also protecting the cylinder head against the distortion. Consequently, the carrier plates with the beads thereon and the stopper plate with the folded constructions thereon are both made less in the behavior of deformation whereby the beads may be protected against crack. It is thus critical that the gaps in the folded constructions, preselected properly in the released event before squeezing the head bolt, must be so regulated as to be kept at an efficient interval even in the engine operation.

If either the deterioration in sealing performance or the crack in beads may be eliminated by only the common regulation to the gaps in the folded constructions, the regulation of the gaps in the released event before squeezing should be individually calibrated for every cylinder bore opening corresponding to each cylinder bore. Moreover, the gaps in the folded constructions may each varied in interval along the circumference of the associated cylinder bore opening. Distribution of a desired compressive surface-to-surface pressure around the cylinder bore openings is obtained by regulating conditions as to the gaps, doubled widths of the folded constructions in the released event along the circumference of the associated cylinder bore opening. Moreover, the distribution of the desired compressive surface-to-surface pressure may be found by calibrating the conditions as to the gaps, doubled widths, amounts of compressive stop or shoulder of the folded constructions, which have been given in the released event, along the circumference of the associated cylinder bore opening corresponding to each cylinder bore, in compliance with a distribution of distortion in the cylinder bores, which is actually measured during the engine operates. To cope with large intolerable clearances, the distribution of the compressive surface-to-surface pressure is adjusted in such a manner as to place weight on the stopper areas than on the bead areas. The application of large compressive stress onto the bead areas at the start of squeezing raises the permanent deformation of the folded flange areas in the folded constructions, which causes the premature permanent set or fattening out in fatigue of the beads, thereby resulting in rapid deterioration of the sealing performance. Accordingly, it is preferred to carry out the simultaneous regulation or calibration of the beads in width and height.

For continuing to keep the sealing performance for the acceptable service life, it is preferred to make any width of the folded construction less at an area between any two adjoining bore openings, but increased at areas much subjected to distortion of the cylinder head, provided if the flange areas are folded back on the side of the cylinder block. Moreover, the regulation on the folded constructions and the beads along the circumference of the associated bore opening may be made common to the cylinder bore openings.

In the metal gasket of the present invention constructed as described just above, the folded constructions having the gaps may well follow the changes of the intolerable clearances, occurring around the cylinder bores in the cylinder block, by the elastic action of the gaps to thereby compensate for the intolerable clearances with the folded constructions, thus keeping the areas around the cylinder bores at an adequate compressive surface-to-surface pressure and ensuring good sealing performance.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
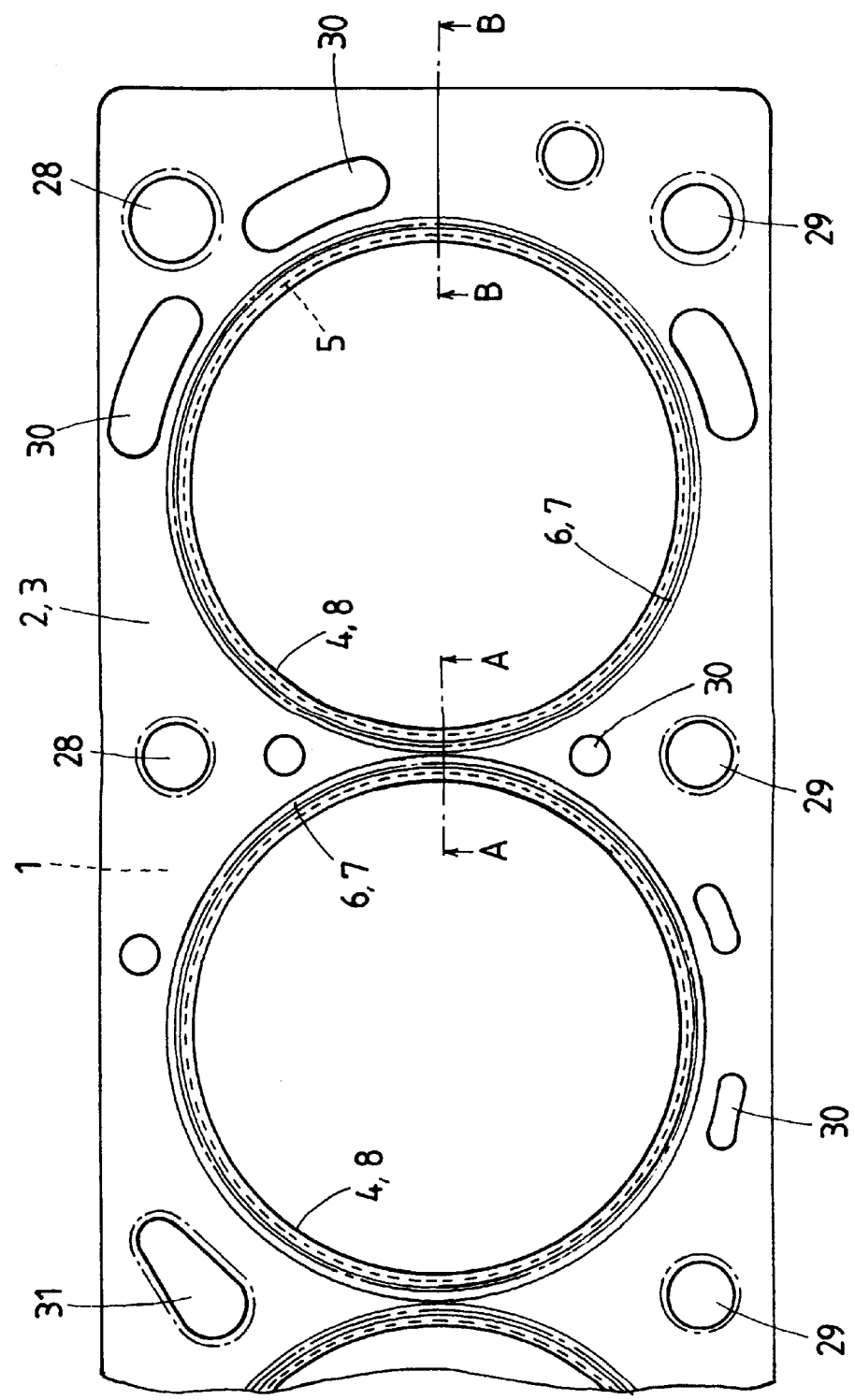
FIG. 1 is a fragmentary plan view showing a preferred embodiment of a metal gasket according to the present invention.
Figure 2:
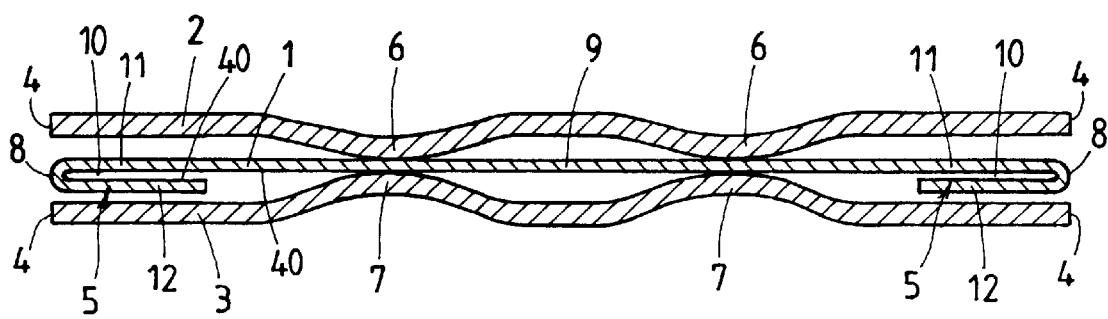
FIG. 2 is an enlarged cross-sectioned view along the section line A—A of FIG. 1.
Figure 3:
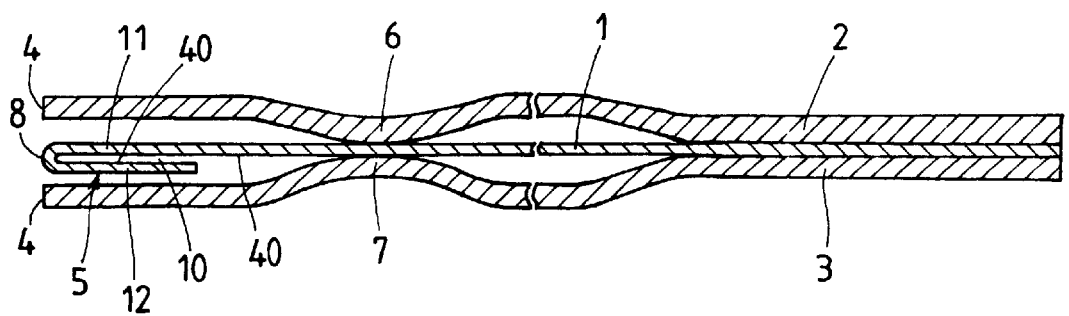
FIG. 3 is an enlarged sectional view taken along the line B—B of FIG. 1.
Figure 4:
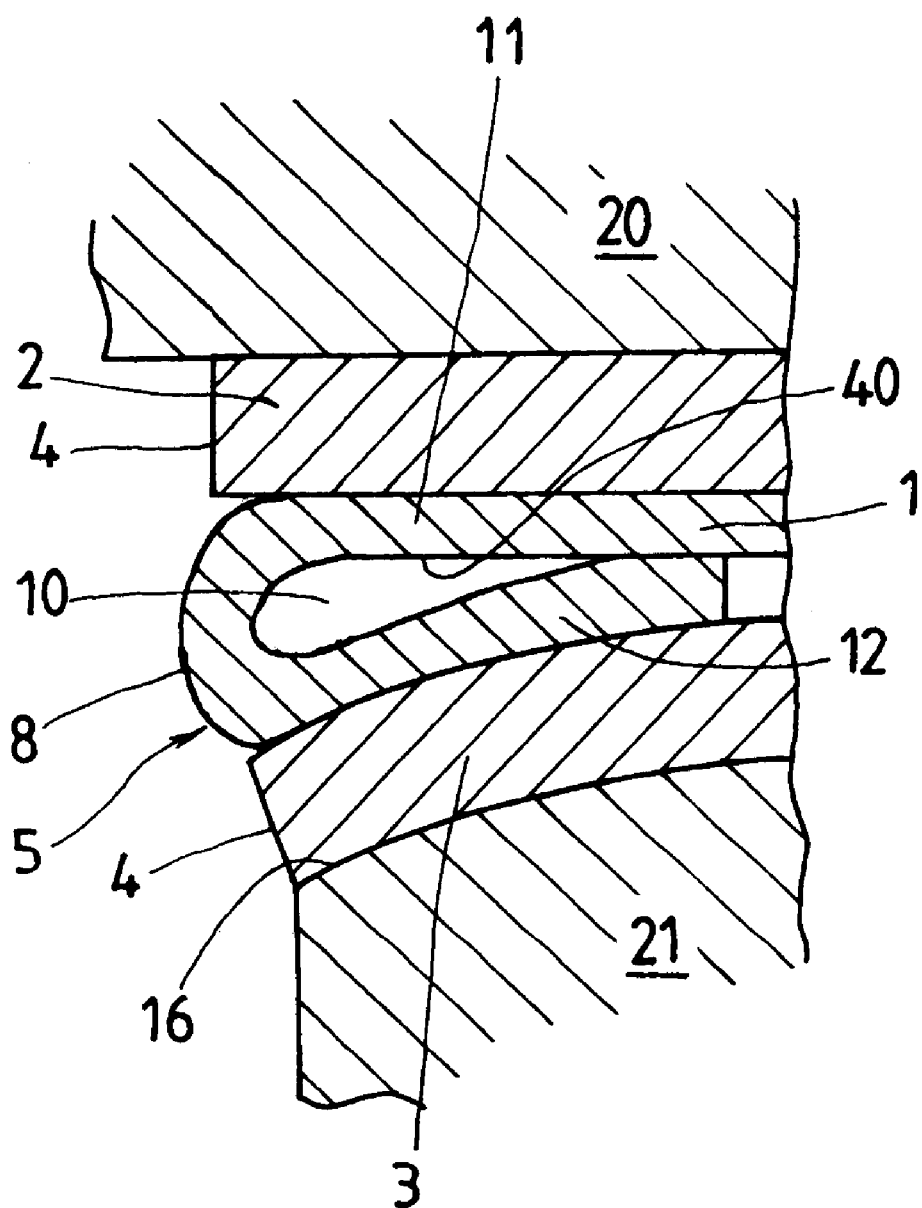
FIG. 4 is a fragmentary enlarged sectional view showing exaggeratedly a metal gasket at an areas around the periphery of a cylinder bore opening, in which a folded construction of a stopper plate compensates for distortion having occurred in a cylinder block around any cylinder bore.

The metal gasket according to the present invention will be in detail explained below with reference to the preferred embodiments of the present invention shown in accompanying drawings.

First referring to FIGS. 1 to 4 showing a preferred embodiment of the metal gasket according to the present invention, the metal gasket according to the present invention is used arranged between the confronting surfaces of the cylinder head 20 and the cylinder block 21 to seal between the mating surfaces. The metal gasket is comprised of at least one carrier plate 2, 3 of elastic metallic sheet provided thereon with corrugations, or beads 6, 7, which extend in an annular configuration around the peripheries of cylinder bore openings 4 that are provided in the carrier plate in alignment with cylinder bores, not shown, of a multi-cylinder engine, and a stopper plate 1 of metallic sheet overlaid so as to make a direct abutment against the crests, or raised surfaces, of the beads 6, 7. Both the carrier plates 2, 3 and the stopper plate 1 have knock-out holes 28, holes 29 for tightening bolts, water holes 30, oil holes 31 and the like, which are well known to those skilled in the art and therefore the detailed description thereof will be left out. The holes are surrounded with undurations, or half beads, for sealing.

The stopper plate 1 is provided therein with cylinder bore openings, or second bore openings 8, which are juxtaposed in correspondence in their number and position with the cylinder bore openings 4 in the carrier plates 2, 3. The carrier plates 2, 3 are worked to develop annular beads 6, 7 around the cylinder bore openings 4, whereas the stopper plate 1 is folded back partially along the peripheries of the cylinder bore openings 4 to thereby provide annular folded constructions 5. The carrier plates 2, 3 are arranged with respect to the stopper plate 1 in such a manner that the crests of the beads 6, 7 are opposite to each other and make abutment against opposing surfaces of a major portion 9 of the stopper plate 1. Thus, the crests of the beads 6, 7 on the carrier plates 2, 3 are brought into engagement with the stopper plate 1 at areas spaced away from the folded constructions 5.

It will be understood that the stopper plate 1 comprises the major flat portion 9 and annular folded constructions 5, each of which is integral with the major flat portion 9 and defines the bore opening at its bent 8 in alignment with the associated bore opening 4. The folded constructions 5 of the stopper plate 1 are each composed of a folded flange 12 extending about the associated bore opening 8 and a counterpart 11 over which the flange 12 is folded back, providing a gap 10 between them to make the flange 12 possible undergo the elastic deformation, thereby ensuring a preselected compressive surface pressure at the folded construction 5. It is in particular critical that the opposing flanges 12 and counterparts 11, even under the tightened or squeezed together conditions, are not brought into surface-to-surface close engagement with each other throughout the confronting surfaces thereof, but kept in a spaced relationship, with leaving the gaps 10 of a desired interval. In order to compensate snugly for an intolerable clearance owing to a distortion or deformation 16 occurring in the cylinder liner, not shown, or the cylinder head 20, it is preferred that the interval of the gap 10 defined between the folded flange 12 and the counterpart 11 is in the range of from about 20 $\mu$m to about 200 $\mu$m.

The carrier plates 2, 3 and the stopper plate 1 may be fabricated with the metalworking conditions, for example, as will be described below. For the preparation of the carrier plates 2, 3, a blank stamped out from a stainless steel sheet of 0.20mm thick is worked to develop the corrugations or beads thereon, and then subjected to heat treatment and surface treatment in an elastic metal plate that has the desired tensile strength, elongation and hardness for the carrier plates 2, 3. On the other hand, a blank for the stopper plate 1 is stamped out of a stainless steel sheet of 0.12 mm thick, and worked to form folded constructions. It is to be noted that the stopper plate 1 is subjected to no coating on both the opposite surfaces. The folded constructions 5 each include the gap 10 of about 60 $\mu$m and the folded flange 12 of about 1 to 2 mm in width. Moreover, the folded constructions 5 of the stopper plate 1 may be anticipated providing about 0.17 mm(=0.05+0.12) of the amount of compression stop to control the degree of compression exerted on the beads 7 of the carrier plates 2, 3.

Figure 5:
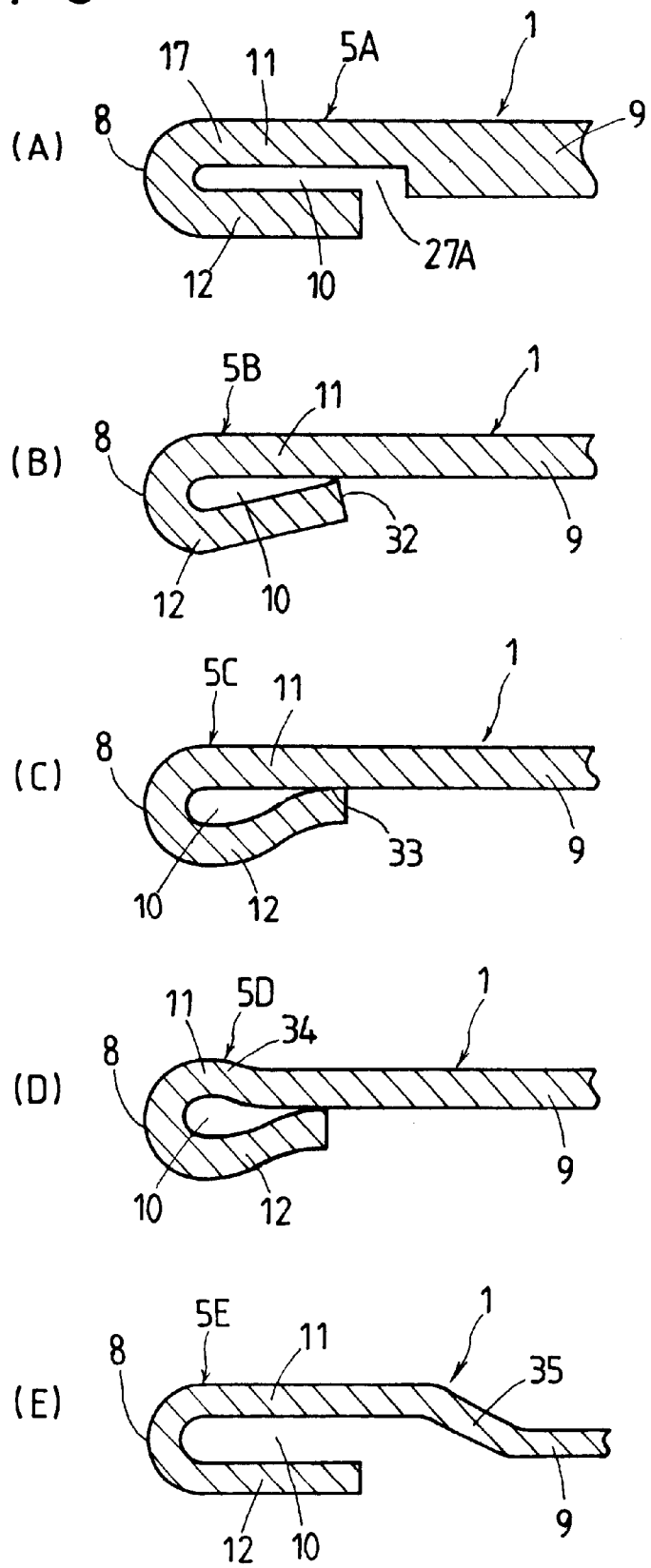
FIG. 5 is an illustration of fragmentary enlarged sectional views showing five embodiments of the folded construction on the stopper plate incorporated in the metal gasket shown in FIG. 1.

As shown in FIG. 5, various modifications of the folded constructions 5 may be configured on the stopper plate 1.

A folded construction 5A shown in FIG. 5(A) is formed at a thin area 17 less in thickness compared with the residual major portion 9 of the stopper plate 1. For example, the thin area 17 is formed reduced in thickness to an extent more than half the major portion 9. A flange area 12 is folded back over a counterpart area 11 so as to provide the gap 10 between them, which is substantially uniform in interval throughout the confronting surfaces of them, thereby resulting in providing the folded construction 5A. In this case, the folded flange area 12 is designed such that an annular slit 27A is formed between a shoulder of the major portion 9 and the free end of the flange area 12. That is to say, the width of the flange area 12 is determined less in length than the counterpart area 11 by the length of the slit 27A.

A folded construction 5B shown in FIG. 5(B) is formed by folding back a flange area 12 over a counterpart area 11 in such a manner that the folded flange area 12 is brought into abutment at only its distal edge 32 against the counterpart area 11, thereby providing a doughnut-shape gap 10 around the associated bore opening.

A folded construction 5C shown in FIG. 5(C) is formed by folding back a flange area 12 over a counterpart area 11 in such a manner that the folded flange area 12 is brought into surface-to-surface engagement with the counterpart area 11 at a narrow area neighboring its distal edge 33, thereby providing a doughnut-shape gap 10 around the associated bore opening.

A folded construction 5D shown in FIG. 5(D) is formed by folding back a flange area 12 over a counterpart area 11 in such a manner that the folded flange area 12 is brought into surface-to-surface engagement with the counterpart area 11 at a narrow area neighboring its distal edge, which is further raised at 34 above one surface of the major portion 9 in opposition to the folded flange area 12, thereby providing a doughnut-shape gap 10 around the associated bore opening.

Finally, in a folded construction 5E in FIG. 5(E), the major portion 9 includes an offset portion 35 remote from the side of a folded flange 12. Thus, a flange area 12 is folded back over a counterpart area 11 so as to provide a gap 10 between them, whereby the gap 10 is made substantially uniform in interval throughout the confronting surfaces of them, thereby resulting in providing the folded construction 5E.

The amount of compression stop to control the degree of compression exerted on the beads 6, 7 comes into action due to the difference in thickness between the folded construction 5 and the major portion 9 of the stopper plate 1. For example, the amount of compression stop anticipated at the folded construction 5 is in the range of about 100 $\mu$m to 360 $\mu$m.

Figure 19:
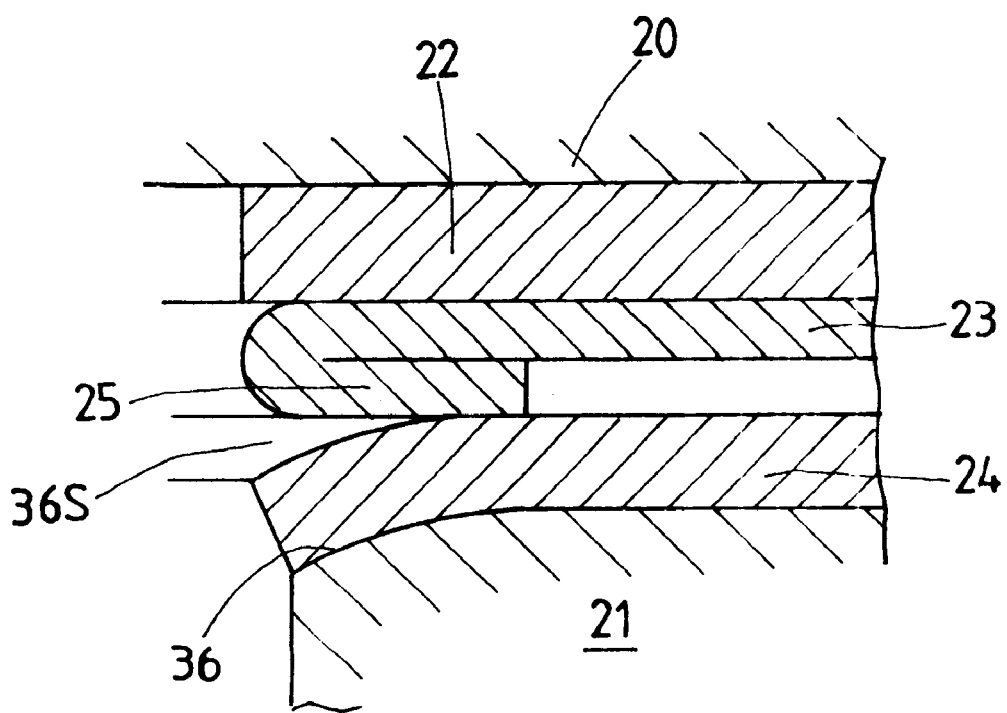
FIG. 19 is a fragmentary enlarged sectional view showing exaggeratedly the distortion having occurred in the cylinder block around any cylinder bore in which a prior metal gasket is shown incorporated at an areas around the periphery of the cylinder bore.

The metal gasket having the amount of compression stop as described just above, under static squeezed event, may adjust the compressive surface-to-surface pressure at the folded constructions 5 of the stopper plate 1 to the range of from 70 Mpa to 140 Mpa, the compressive surface-to-surface pressure at the beads 6, 7 on the carrier plates 2, 3 to the range of 10 Mpa to 110 Mpa, and also make the compressive surface-to-surface pressure, occurring at the folded constructions 5, greater than that at the beads 6, 7. Consequently, the metal gasket certainly ensures the range of the compressive surface-to-surface pressure desirable to compensate for the intolerable clearance at 36S in FIG. 19, which might otherwise occur owing to the distortion at 36 in FIG. 19 in either the cylinder block 21 or head 20.

The distortion occurring in the cylinder head in tests simulating for the actual engine operation may be measured by clearance sensors embedded in the upper mating surface of the cylinder block and by the use of non-contacting eddy current sensors monitoring the behavior of relative displacement that might happen between the cylinder block and the head. As an alternative, the distortion may be detected by any other sensor in which a digital depth gauge of direct-contact type monitors the behavior of the relative displacement when the associated cylinder is subjected to the maximum cylinder pressure loading. Moreover, regarding conditions on actual measurement of the displacement occurring in the cylinder head under the events simulating for actual engine operation, the conditions as to the width of the folded flange, the gap between the folded flange area and its counterpart area and the amount of compression stop are adequately selected and regulated in accordance with the conventional static system and the tests simulating for the actual engine operation, to thereby achieve the conventional standard of the desired uniform distribution of compressive surface-to-surface pressure. Then, the tests simulating for the actual engine operation may be carried out by proper selection of operation conditions out of preselected continuous high-speed tests, integration tests, durability tests or the like, thereby measuring the actual distribution of distortion for every cylinder bore. The resultant data results in preparing graphic representations showing the maximum distortion in directions, either parallel with or normal to the cylinder bore array.

At least one pair of the surfaces of the carrier plates 2, 3, either outer surfaces backing against each other or inner surfaces opposite to each other, is coated with non-metallic material such as resins or rubbers, for example, fluorocarbon rubber, of thermal resistance and oil resistance having a thickness of, for example, from about 10$\mu$ to 30$\mu$. Elastic coating 40 is applied, either partially or entirely, to opposing surfaces of the confronting folded flange area 12 and counterpart area 11 at the folded construction 5.

Figure 6:
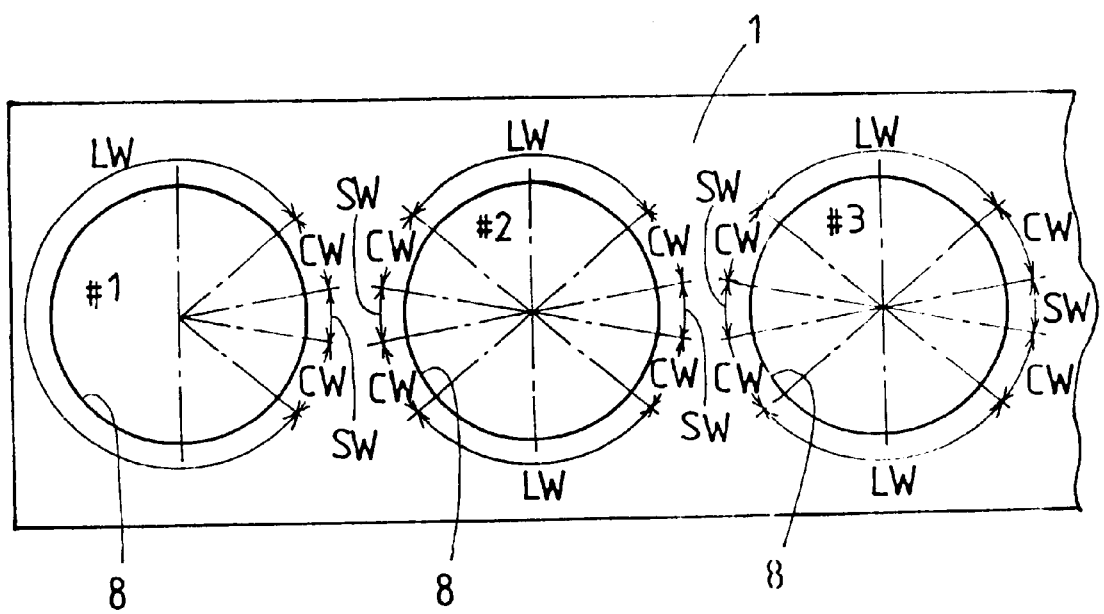
FIG. 6 is a fragmentary schematic view explanatory of the stopper plate in the metal gasket in FIG. 1.

On the metal gasket applied to a six-cylinder having a first cylinder 1, a second cylinder 2 and a third cylinder 3 as shown in FIG. 6, the folded flange in the folded construction 5 may be varied in width along periphery of the associated cylinder bore opening 8. Each folded construction 5 is made narrow for angular zones SW, each having about 20 degrees, extending in symmetry with respect to a bisecting plane spanning across the centers of any adjoining cylinder bore openings 8. The folded construction 5 is made wide for major sectorial zones LW, each extending in symmetry with respect to a plane turning at an angle of 90 degrees from the bisecting plane. The width of the folded construction 5 is made varied gradually at intermediate zones CW of about 10 to 40 degrees. The beads 6, 7 may be also varied in their widths along the circumferential direction thereof. For example, each boundary area between any associated adjoining cylinder bore openings 8 is made extremely narrowed and, therefore, the folded construction 5 is made reduced in width at the boundary area, compared with other areas where the folded construction 5 becomes large in width as leaving the boundary area. The beads 6, 7 are made, like the folded construction 5, less in width at the boundary area between any adjoining bore openings 8, compared with other areas where the beads 6, 7 are made widened in width as leaving the boundary area.

Figure 7:
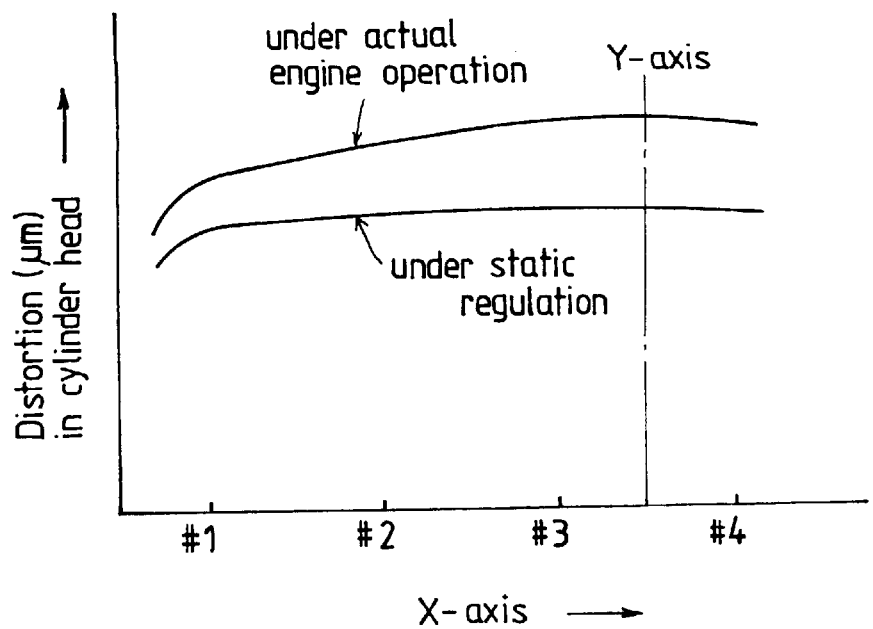
FIG. 7 is a graphic representation of distortion in a cylinder head in a multi-cylinder engine in terms of x-axis.
Figure 8:
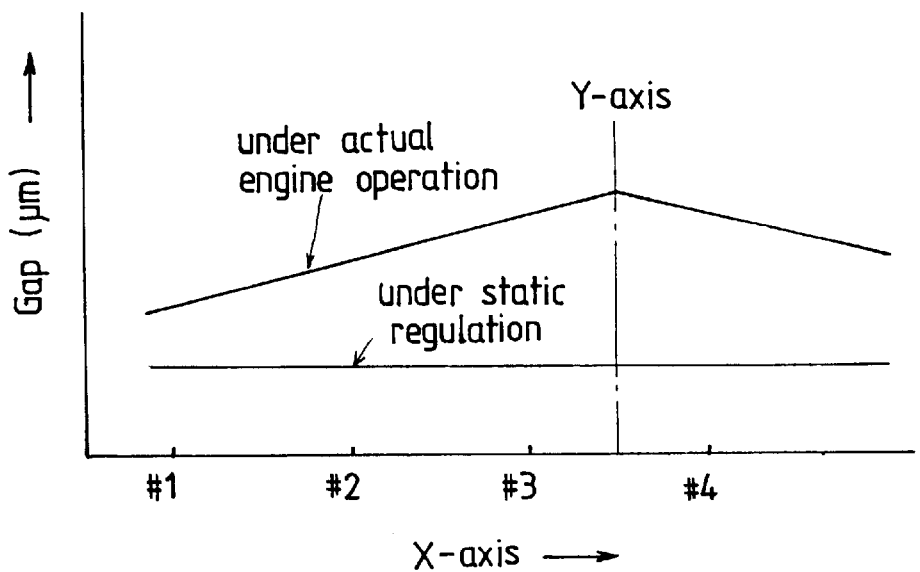
FIG. 8 is a graphic representation explaining gaps in folded constructions on the stopper plate at every cylinder bore opening.
Figure 9:
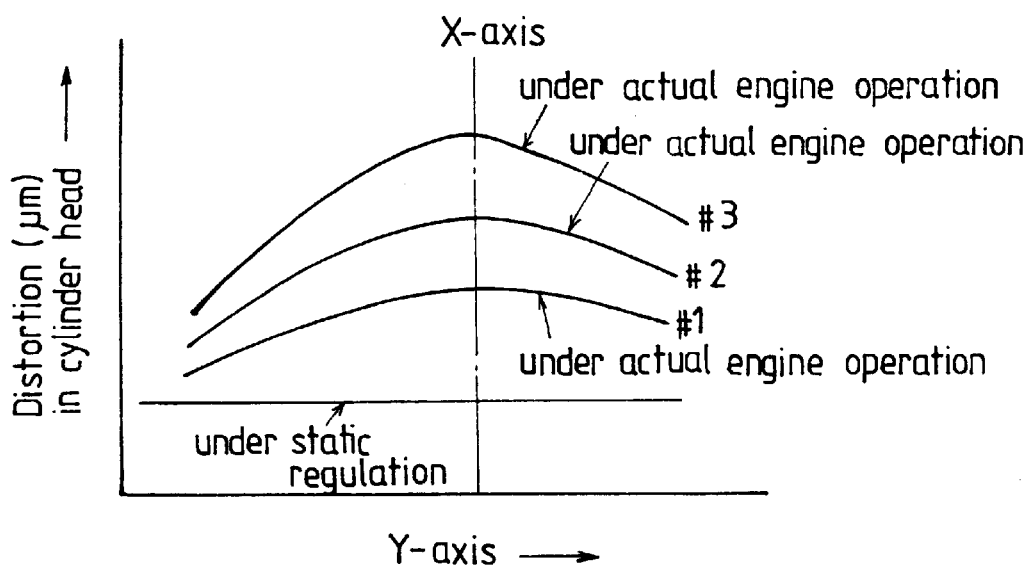
FIG. 9 is a graphic representation of distortion in a cylinder head of a multi-cylinder engine in terms of y-axis.
Figure 10:
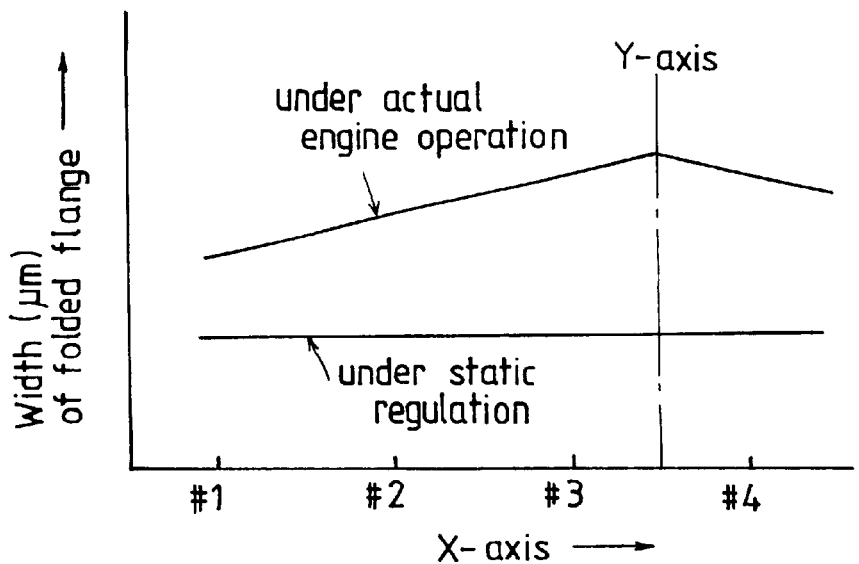
FIG. 10 is a graphic representation explaining widths of the folded constructions on the stopper plate at every cylinder bore opening.

FIGS. 7 to 10 show dimensional changes in the metal gaskets of the present invention, which are incorporated in the six-cylinder engine. In detail, FIG. 7 shows the distortion ($\mu$m) in the head under static regulation and actual engine operation in terms of the direction along the x-axis extending through the centers of the bore openings 8, and FIG. 8 represents the changes of gap ($\mu$m) for every cylinder arranged along the x-axis extending through the centers of the bore openings 8, providing the gap in the folded construction 5 is made uniform along the circumference of every associated bore opening 8. Moreover, FIG. 9 represents the distortion ($\mu$m) in the head under static regulation and actual engine operation in terms of the direction along the y-axis which is normal to the x-axis extending through the centers of the bore openings 8, and FIG. 10 is the changes in width of the folded flange area for every cylinder arranged along the x-axis extending through the centers of the bore openings 8, providing the width of the folded flange area is made uniform along the circumference of every associated bore opening 8.

Figure 11:
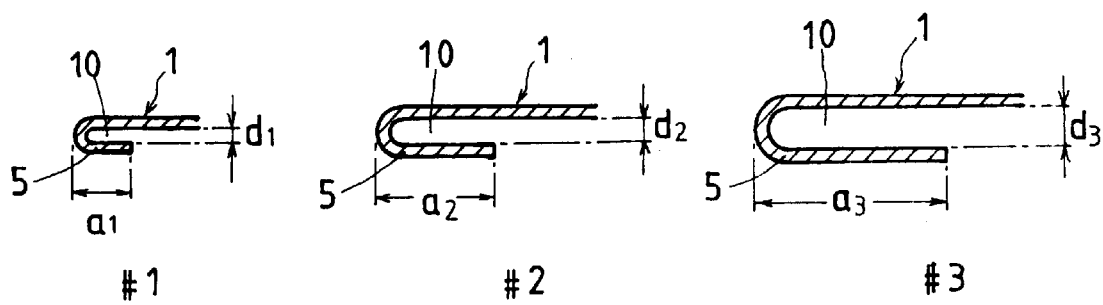
FIG. 11 is a schematic view illustrating an embodiment of the relationship of the gaps with the widths of the folded constructions on the stopper plate at every cylinder.
Figure 12:
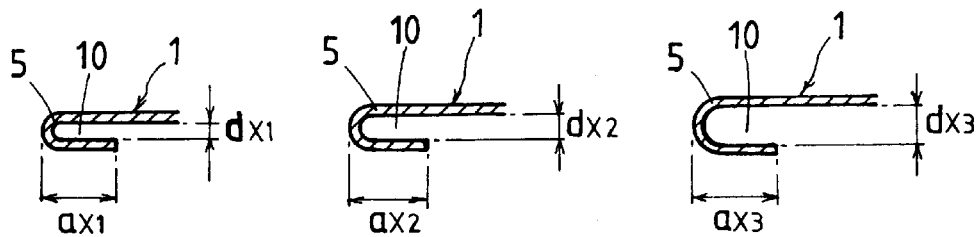
FIG. 12 is a schematic view illustrating another embodiment of the relationship of the gaps with the widths of the folded constructions on the stopper plate at every cylinder in terms of x-axis.
Figure 13:
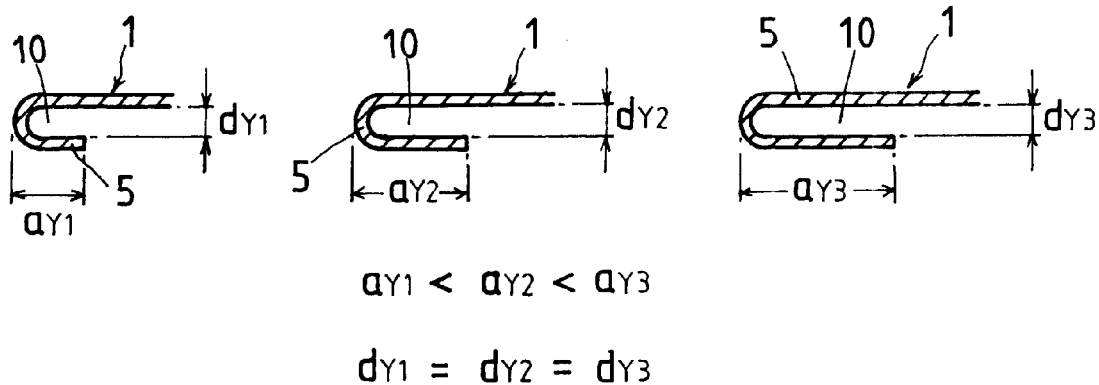
FIG. 13 is a schematic view illustrating a further another embodiment of the relationship of the gaps with the widths of the folded constructions on the stopper plate at every cylinder in terms of y-axis.

FIGS. 11 to 13 illustrate the shapes of the folded constructions 5 which are formed on the stopper plate 1 for every cylinder in correspondence with the six-cylinder engine shown in FIG. 6. In the embodiment shown in FIG. 11, the folded construction 5 for the first cylinder #1 has a gap of $d_1$ and a width of $a_1$; for the second cylinder #2, a gap of $d_2$ and a width of $a_2$; and for the third cylinder #3, a gap of $d_3$ and a width of $a_3$. According to the embodiment in FIG. 11 in which each folded construction 5 for every cylinder is made uniform along the circumference thereof, the gap $d_3$ and the width $a_3$ are made larger, whereas the gap $d_1$ and the width $a_1$, are smaller, and the gap $d_2$ and the width $a_2$ are medium.

Namely, the relations $a_3>a_2>a_1$ and $d_3>d_2>d_1$ exist.

FIGS. 12 and 13 represent the folded constructions 5, each for each the first cylinder #1, the second cylinder #2 and the third cylinder #3, which are shown in section taken along the x-axis extending through the centers of the bore openings 8 and along the y-axis normal to the x-axis, respectively. Regarding the direction of the x-axis in FIG. 12, assuming that the gap and the width of the folded construction 5 for the first cylinder #1 are defined as $dx_1$ and $ax_1$, respectively for second cylinder #2, $dx_2$ and $ax_2$; and for the third cylinder #3, $dx_3$ and $ax_3$, the gaps $ax_1$, $ax_2$ and $ax_3$ are identical in interval with each other, whereas the width $dx_3$ is made larger, the width $dx_1$ is small and the width $dx_2$ is medium. That is, $ax_1=ax_2=ax_3$ and $dx_3>dx_2>dx_1$. Considering the direction of the y-axis, when the gap and the width for the first cylinder #1, likewise as in the x-axis described, are referred to as $dy_1$ and $ay_1$; for the second cylinder #2, $dy_2$ and $ay_2$; and for the third cylinder #3, $dy_3$ and $ay_3$, the gaps $ay_1$, $ay_2$ and $ay_3$ are identical in interval with each other, whereas the width $dy_3$ is made larger, the width $dy_1$ is small and the width $dy_2$ is medium. That is, $ay_1=ay_2=ay_3$ and $dy_3>dy_2>dy_1$.

Figure 14:
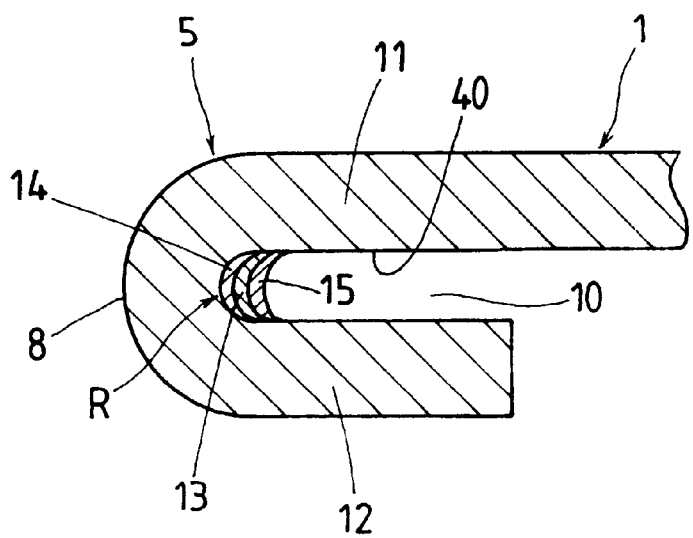
FIG. 14 is a fragmentary schematic section showing another embodiment of the folded construction of the stopper plate.
Figure 15:
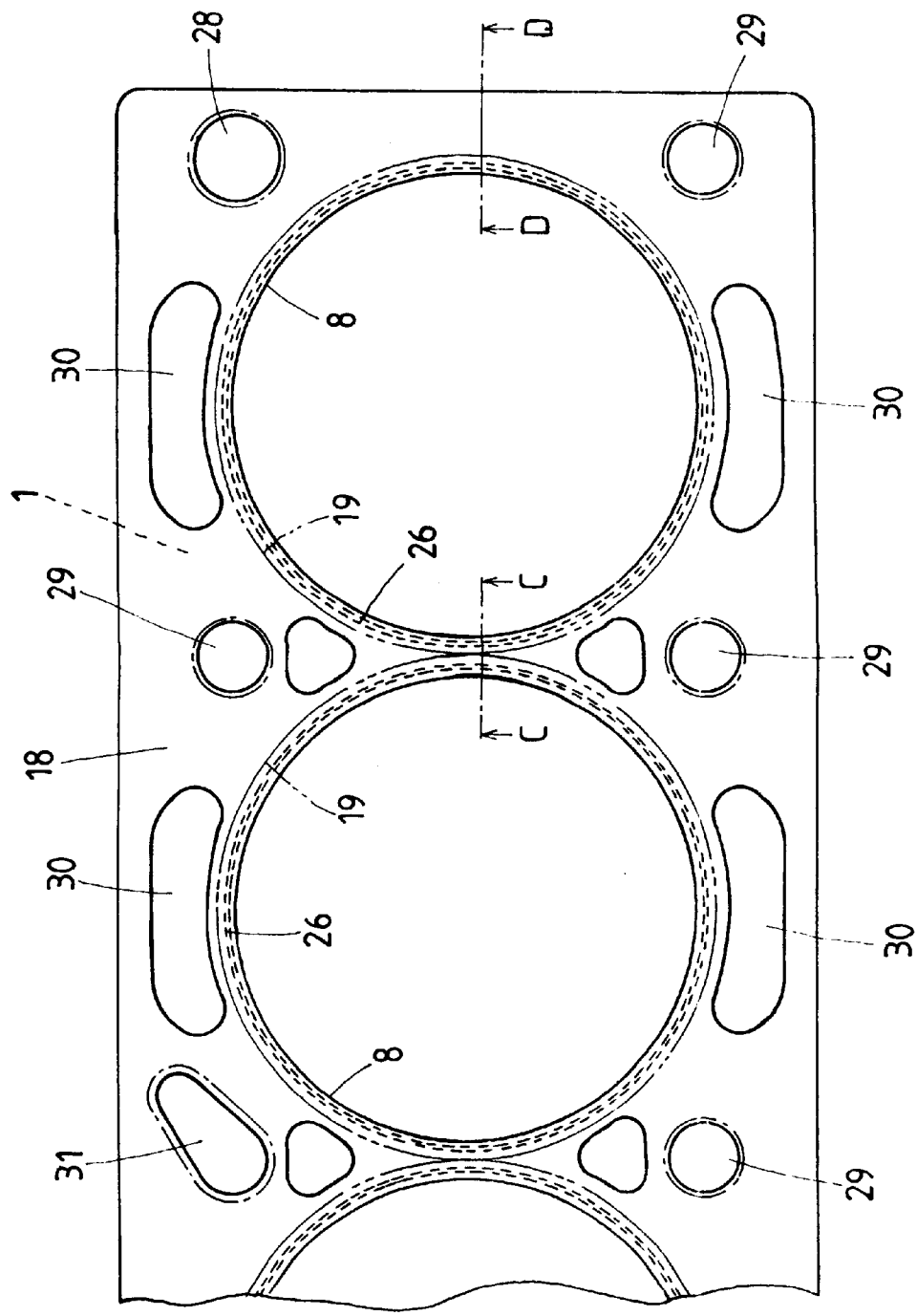
FIG. 15 is a fragmentary plan view showing another embodiment of a metal gasket according to the present invention.
Figure 16:
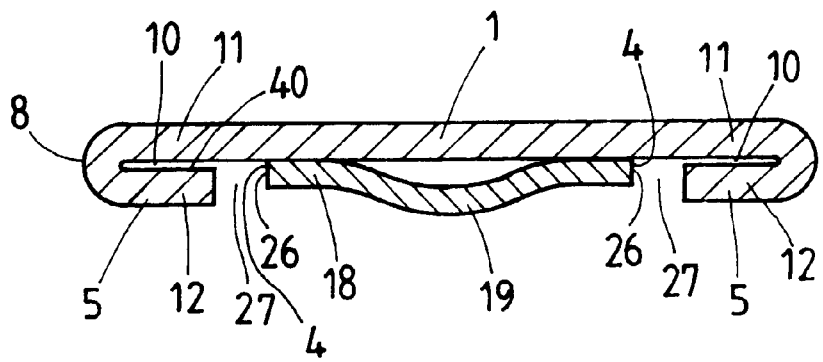
FIG. 16 is an enlarged cross-sectioned view along the section line C—C of FIG. 15.
Figure 17:
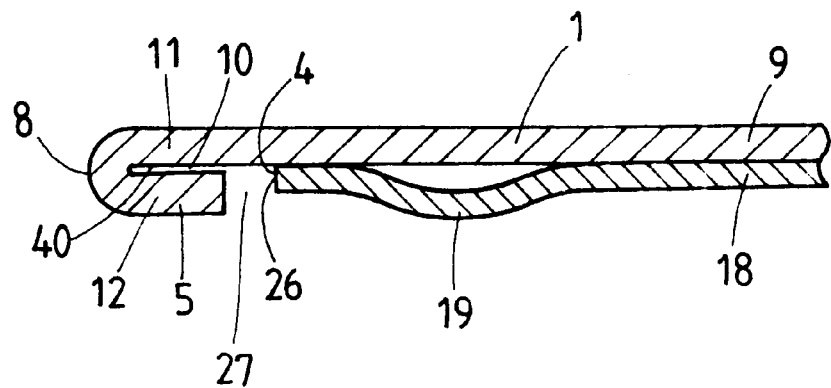
FIG. 17 is an enlarged sectional view taken along the line D—D of FIG. 15.

As apparently shown in FIG. 14, the folded construction 5 in the metal gasket is applied with a composite material 13 containing aluminum and chlorine at a compression side R of a sharp bent. The applied composite material 13 is held at the sharp bent by heat resisting rubber, which is adhered to the compression side R in the folded construction 5. Moreover, a penetration layer 14 of aluminum is formed by thermal diffusion of aluminum on the surface of the compression side of the sharp bent to thereby increase the strength at the compression side R, which is thus protected from the permanent set or crush owing to fatigue, resulting in improving in durability. Aluminum in the composite material 13 may be of either powdery aluminum alone or powdery aluminum alloys while chlorine may be of either ammonium chloride or aluminum chloride. The composite material 13 is prepared in a pasty mixture containing therein chlorine of 0.05 to 0.2 wt %. The heat resisting rubber 15 is preferably used applied for moisture proof till the gasket is mounted in the engine.

Aluminum in the composite material 13 vapors in aluminum chloride at high temperature caused by the engine operation, and then deposits in the form of aluminum alone at cooled-down atmosphere. The aluminum deposit penetrates by thermal diffusion into the matrix of steel plate such as stainless steel (SUS) plate, thereby forming the penetration layer 14 of aluminum on the surface of the compression side in the folded construction 5. The penetration layer 14 is a surface area of about several $\mu m$ thick and higher in hardness, compared with the metal plate, so that the compression side R is improved in strength and protected against the permanent set or deformation. Chlorine contained in the penetration layer 14 is trapped in the composite material 13 at low temperature for reuse. Otherwise, although the chlorine evaporates by little and little out of the penetration layer 14, the evaporated constituent of chlorine is so small in amount and so rapid that it is almost never corrosive to the gasket and other engine parts.

The heat resisting rubber 15 demonstrates a cushioning performance at the folded construction 5. As will be described later, for example, on the metal gasket having only a sheet of the stopper plate 1 to seal around the bore openings 8, it is preferred that the folded constructions 5 is arranged with their folded flanges 12 opposing against the cylinder block 21, and the folded constructions 5 are each applied with elastic material at its compression side R, either partially or entirely, which may thus keep the cushioning performance or spring effect at the gap 10, thereby protecting the beads 6, 7 from the permanent set or flattening out.

According to another embodied metal gasket of this invention, not shown, two sheets of the stopper plate may be used interposed between the carrier plates with beads. In this embodiment, any one of the stopper plates has the folded constructions, whereas the other stopper plate is undulations such as half beads or raised portions resembling the half beads in opposition to the folded constructions. The stopper plate with the folded constructions may be arranged such that its folded flange areas are brought into direct contact with the beads on the carrier plates or the half beads on the other stopper plate. In addition, the stopper plate with the half beads is arranged such that the half beads oppose to any one of the carrier plates and extend spacing apart from the folded construction. The stopper plate with the folded flange areas being opposite to the carrier plate is advantageous to the engine, which is less in the distortion of the cylinder block 21 and in the intolerable clearances resulting from the distortion of the cylinder block 21. In the preferred arrangement of the gasket including two sheets of the carrier plate and two sheets of the stopper plate, on the other hand, the stopper plate with the folded constructions is superposed on the other stopper plate with the half beads in such a relation that the folded flange areas are opposite to the other stopper plate. This arrangement of the gasket is also suitably applied to the precombustion diesel engines.

Referring to FIGS. 15 to 18 showing a further another embodiment of the metal gasket according to the present invention, this embodied metal gasket is composed of the stopper plate 1 and at least one carrier plate 18 with beads overlaid with the stopper plate 1. As the stopper plate 1 of this embodiment is identical with that of the first embodiment described previously, like reference characters denote the components or parts like in structure and function and the detailed description therefor will be omitted hereinafter.

The stopper plate 1 is made of an elastic metal sheet provided with the folded constructions 5 where the metal sheet is folded back in the form of annulation so as to define the bore openings 8. The carrier plate 18 with beads is also made of an elastic metal sheet that is provided with the bore opening 4 and worked to develop beads 19 extending around the bore openings 8. The carrier plate 18 is overlaid with the major flat surface of the stopper plate 1 other than the folded constructions 5 in such a relation that the carrier plate 18 makes surface-to-surface contact with the stopper plate 1 on the side of its one surface recessed partially below the surface to develop the beads 19, which are raised above the opposite surface thereof. There are provided annular spaces 27 between annular distal ends of the folded flange areas 12 of the folded constructions 5 and perimetric edges 26 of the carrier plate 18. The annular spaces 27 are designed to keep an adequate interval to avoid an interference of the carrier plate 18 with the folded construction 5 in whatever state the gasket is released, squeezed by head bolts or loaded due to engine operation.

Figure 18:
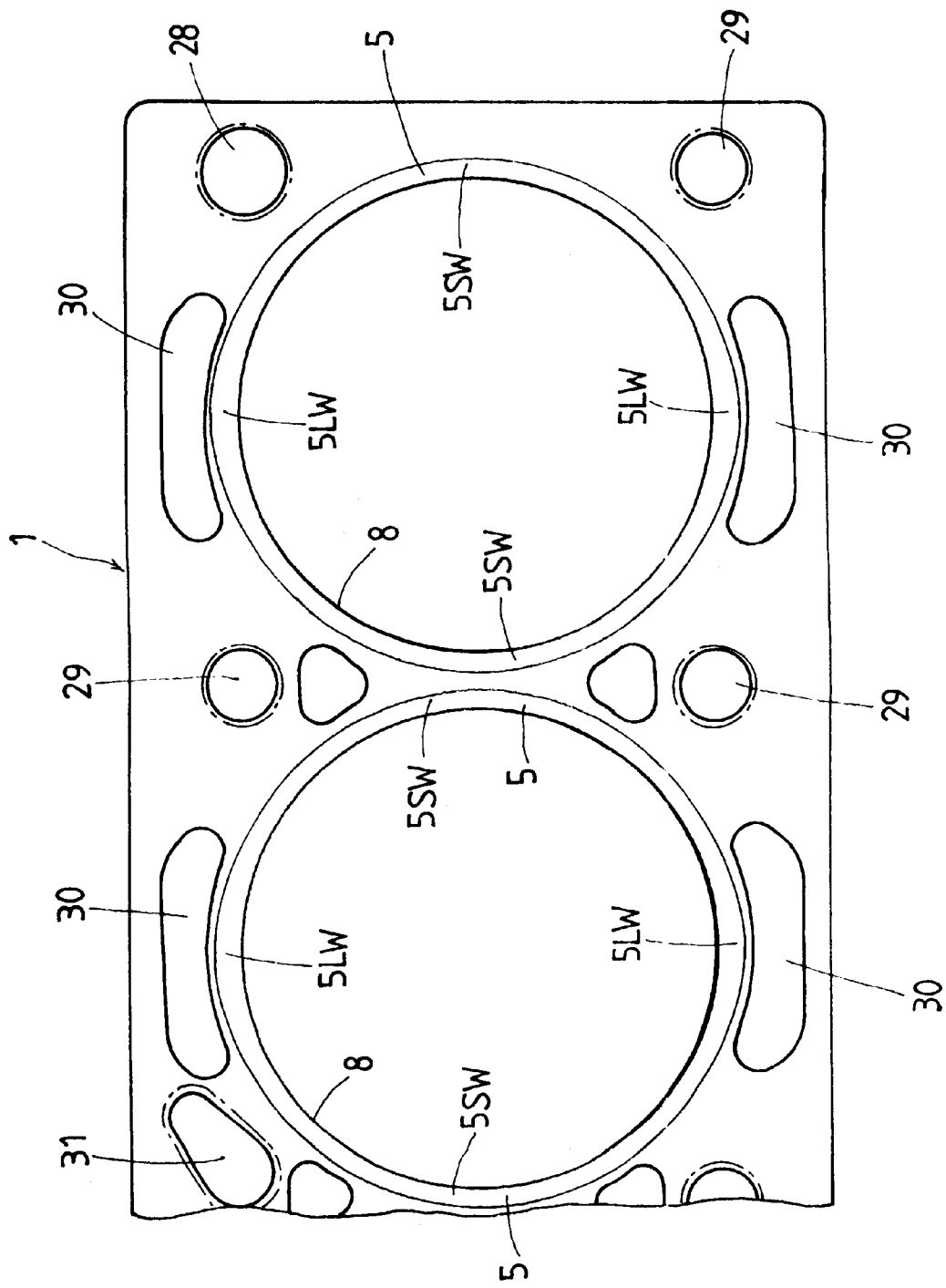
FIG. 18 is a plan view explanatory of the widths of the folded flanges on the stopper plate.

The folded constructions 5 of the stopper plate 1 in this embodied gasket, as apparent from FIG. 18, each vary in the width along the circumference of the associated bore opening 8. That is to say, the folded construction 5 is made less in width at angular zones 5SW, each extending in symmetry with respect to a bisecting plane spanning across the centers of any adjoining bore openings 8, and made greater at other residual zones 5LW.

The carrier plate 18 and the stopper plate 1 may be fabricated with the metalworking conditions, for example, as will be described below. On production of the carrier plate 18, a sheet of stainless steel (SUS301—¾) of 0.2 mm thick is sheared into a blank, which is then subjected to metalworking process such as corrugation to develop the beads thereon and followed by heat-treatment and surface-treatment for providing an elastic metal plate having a desired tensile strength, elongation and hardness. On the other hand, a blank for the stopper plate 1 is stamped out of a stainless steel sheet (SUS304) of 0.35 mm thick, and worked to form folded constructions. The stopper plate 1 is applied on its opposite surfaces with fluorocarbon rubber coatings of about 0.015 mm thick. The folded constructions 5 each include the gap 10 of about 50 $\mu$m when the stopper plate 1 is applied with the coatings, or about 80 $\mu$m if the stopper plate 1 has no coating. The folded constructions 5 each have the width of in the range of from 1 to 3 mm. folded flange 12 of about 1 to 2 mm in width. Moreover, the folded constructions 5 of the stopper plate 1 may be anticipated providing about 0.13 mm(=0.35+0.22) of the amount of compression stop.

While the present invention has been described in its preferred embodiments, it is to be distinctly understood that the invention is not limited thereto but may be otherwise variously embodied within the scope of the following claims.

What is claimed is:

1. A metal gasket comprising at least one carrier plate of an elastic metal plate adapted to be used interposed between a cylinder block and a cylinder head to be fixed to the cylinder block, the carrier plate being provided with a plurality of first bores and a bead developed along each said first bore, and a stopper plate of an elastic metal plate overlaid on the carrier plate, the stopper plate being partially folded back thereby providing annular folded constructions to define a plurality of second bores each being in alignment with an associated first bore of said plurality of first bores, wherein the beads on the carrier plate are overlaid on the stopper plate at areas spaced apart from the folded constructions, said each folded construction composed of a folded flange area and a counterpart area extending along a perimeter of an associated second bore, of said plurality of second bore and the folded constructions each include a gap of a preselected interval between the folded flange area and the counterpart area to provide elasticity at the folded construction continuously whenever the gasket is loaded inclusive of under engine operation, wherein the stopper plate is used in such arrangement that in use the folded flange areas in the folded constructions make contact with the cylinder block whereby the elasticity exerted by the folded flange areas compensates for undue clearances due to any sag occurring in the cylinder block, and wherein the folded constructions of the stopper plate are each regulated in width along circumferences of said associated second bores in such a manner that the folded flange is made narrow for angular zones of about 20° with respect to a plane spanning the center of any adjoining second bores, and the folded flange is made wider for other angular zones shifted 90° out of the plane, and wherein the folded flange gradually varies in width for other residual zones.

2. A metal gasket according to claim 1, wherein the stopper plate is overlaid on the carrier plate such that raised surfaces of the beads on the carrier plate make abutment against a major flat surface of the stopper plate while the beads are spaced apart from perimetric edges of the folded flange areas of the folded constructions in the stopper plate.

3. A metal gasket according to claim 2, wherein the stopper plate is arranged interposed between the carrier plate and a second carrier plate with beads in such a manner that the raised surfaces of the beads on the carrier plates make abutment against the major flat surface of the stopper plate.

4. A metal gasket according to claim 1, wherein the stopper plate is overlaid on the carrier plate such that recessed surfaces of the beads confront a major flat surface of the stopper plate while perimetric edges around the first bores in the carrier plate are spaced apart from the perimetric edges of the folded flange areas of the folded constructions on the stopper plate.

5. A metal gasket according to claim 1, wherein the gaps formed between the folded flange areas and the counterpart areas are preset in a range of from 20 $\mu$m to 200 $\mu$m in a released event before squeezing.

6. A metal gasket according to claim 1, wherein an amount of compression stop anticipated by the folded constructions is preselected in a range of from 100 $\mu$m to 360 $\mu$m in a released event before squeezing.

7. A metal gasket according to claim 1, wherein a compressive surface-to-surface pressure at the folded constructions on the stopper plate is preselected in a range of from 70 MPa to 140 MPa while a compressive surface-to-surface pressure at the beads on the carrier plate is preselected in a range of from 10 MPa to 110 MPa.

8. A metal gasket according to claim 1, wherein the gaps provided between the folded flange areas and the counterpart areas are regulated so as to become larger as the second bore approaches the middle of the gasket in the plane spanning the adjoining second bores.

9. A metal gasket according to claim 1, wherein the folded constructions are regulated in widths so as to increase in width as the second bore approaches the middle of the gasket in the plane spanning the bores.

10. A metal gasket according to claim 1, wherein the folded constructions are formed by partly folding back thin areas of the stopper plate into folded flange areas, which are reduced in thickness, compared with a major portion of the stopper plate, to an extent more than half the major portion.

11. A metal gasket according to claim 10, wherein an amount of compression stop to control the degree of compression exerted on the beads comes into action due to the difference in thickness between the folded construction and the major portion of the stopper plate and, therefore, the amount of compression stop is regulated in accordance with the thickness of the thin areas, which is reduced, compared with the major portion.

12. A metal gasket according to claim 1, wherein confronting surfaces of the folded flange areas and the counter areas are at least partially coated with elastic material.

13. A metal gasket comprising at least one carrier plate of an elastic metal plate adapted to be used interposed between a cylinder block and a cylinder head to be fixed to the cylinder block, the carrier plate being provided with a plurality of first bores and a bead developed along each first bore, and a stopper plate of an elastic metal plate overlaid on the carrier plate, the stopper plate being partially folded back thereby providing annular folded constructions to define a plurality of second bores, each being in alignment with an associated first bore, wherein the beads on the carrier plate are overlaid on the stopper plate at areas spaced apart from the folded constructions, said each folded construction composed of a folded flange area and a counterpart area extending along a perimeter of an associated second bore, of said plurality of second bores and the folded constructions each include a gap of a preselected interval between the folded flange area and the counterpart area to provide elasticity at the folded construction continuously whenever the gasket is loaded inclusive of under engine operation, and wherein the folded constructions are each applied at a surface of a compression side in a sharp bend with composite material including aluminum and chlorine, and a penetration layer of aluminum is built up on the applied surface of the compression side by thermal diffusion of aluminum when the gasket is in squeezed condition.

* * * * *